(12) United States Patent
He et al.

(10) Patent No.: US 7,885,183 B2
(45) Date of Patent: Feb. 8, 2011

(54) METHOD FOR RECOVERING SERVICE FORWARD ROUTING AND SYSTEM THEREOF

(75) Inventors: Qian He, Shenzhen (CN); Yi Xiong, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 155 days.

(21) Appl. No.: 12/056,471

(22) Filed: Mar. 27, 2008

(65) Prior Publication Data

US 2008/0186844 A1 Aug. 7, 2008

Related U.S. Application Data

(63) Continuation of application No. PCT/CN2006/001279, filed on Jun. 12, 2006.

(30) Foreign Application Priority Data

Sep. 27, 2005 (CN) ........................ 2005 1 0105554

(51) Int. Cl.
| | |
|---|---|
| G01R 31/08 | (2006.01) |
| G06F 11/00 | (2006.01) |
| G08C 15/00 | (2006.01) |
| H04J 1/16 | (2006.01) |
| H04J 3/14 | (2006.01) |
| H04L 1/00 | (2006.01) |
| H04L 12/26 | (2006.01) |

(52) U.S. Cl. ...................................... 370/228; 370/242
(58) Field of Classification Search ................. 370/216, 370/227, 228, 252
See application file for complete search history.

(56) References Cited

U.S. PATENT DOCUMENTS

| 6,542,934 | B1 | 4/2003 | Bader et al. |
| 6,904,018 | B2 | 6/2005 | Lee et al. |
| 7,512,064 | B2 * | 3/2009 | Vasseur et al. ............... 370/227 |
| 2004/0004937 | A1 * | 1/2004 | Skalecki et al. ............. 370/227 |
| 2004/0165537 | A1 * | 8/2004 | Lee et al. ..................... 370/252 |
| 2005/0099941 | A1 * | 5/2005 | Sestito et al. ............... 370/228 |
| 2005/0213513 | A1 * | 9/2005 | Ngo et al. ................... 370/254 |

FOREIGN PATENT DOCUMENTS

JP 2005039362 2/2005

OTHER PUBLICATIONS

Smit et al.,"Intermediate system to Intermediate System Extensions for Traffic Engineering", Jun. 2004, IETF RFC 3784.*

(Continued)

*Primary Examiner*—Huy D Vu
*Assistant Examiner*—Adnan Baig
(74) *Attorney, Agent, or Firm*—Finnegan, Henderson, Farabow, Garrett, & Dunner LLP (57) ABSTRACT

A method for recovering service forward routing includes the steps of: suppressing the service forward routing on a standby link from changing during a routing learning process when a primary link recovers from a fault state to a normal state, establishing a label distribution protocol (LDP) session on the primary link, and redirecting the service forward routing on the standby link to the primary link after the LDP session on the primary link is established.

10 Claims, 3 Drawing Sheets

OTHER PUBLICATIONS

H. Smit, Jun. 2004, RFC 3784 "Intermediate System to Intermediate System Extensions for Traffic Engineering".*

Sharma et al.: "Framework for Multi-Protocol Label Switching (MPLS)-based Recovery"; rfc3469.txt; IETF Standard, Internet Engineering Task Force, IETF, CH, Feb. 1, 2003, XP015009252; Sections 3.2 and 3.8.

Smit Procket Networks et al.: "Intermediate System to Intermediate System (IS-IS) Extensions for Traffic Engineering (TE)"; rfc3784. txt; IETF Standard, Internet Engineering Task Force, IETF, CH Jun. 1, 2004; XP015009564; Sections 3 and 6.2.1.

English translation of Written Opinion of the International Searching Authority, issued by the State Intellectual Property Office, P.R. China, mailed Sep. 21, 2006, in the PCT/CN2006/001279, 3 pages.

European Office Action, dated May 4, 2010, in Appl. No. 06 742 150.3, 4 pages.

* cited by examiner

METHOD FOR RECOVERING SERVICE FORWARD ROUTING AND SYSTEM THEREOF

CROSS REFERENCE TO RELATED APPLICATIONS

This application is a continuation of International Patent Application No. PCT/CN2006/001279, filed on Jun. 12, 2006, which claims priority from Chinese Patent Application No. 200510105554.9, filed on Sep. 27, 2005, each of which is hereby incorporated by reference in its entirety herein.

FIELD OF THE INVENTION

The present invention relates to the field of service-bearing transmission technology, and in particular, to a method for recovering service forward routing and a system thereof.

BACKGROUND OF THE INVENTION

With the development of network technology, users lay more and more strict requirements on the reliability of networks. Network service providers are compelled to provide secure and reliable bearer channels, and when a device or link changes, its impact on the network should be minimized.

With the rapid development of Multi Protocol Label Switch (MPLS) Virtual Private Network (VPN) technology, more and more service providers employ MPLS VPN to bear users, and in use, each Label Switch Path (LSP) is established on the basis of Label Distribution Protocol (LDP). Usually, MPLS VPN reserves a non-preferred standby link respectively for each LSP in the network, and an LDP session is pre-established on the standby link. Therefore, when a failure occurs on the primary link, the LDP may establish a new LSP on the standby link on the basis of the pre-established LDP session and then the services on the failed primary link can be recovered to be borne on the standby link. This recovering process is very short (usually several milliseconds).

However, after the original primary link has recovered to normal state, each router on the network learns the original service forward routing on the basis of Interior Gateway Protocol (IGP). Because the service forward routing of the original primary link is more preferable than that of the standby link, when the service forward routing of the original primary link which is learnt comes into effect, the LDP removes the LSP established on the standby link and attempts to establish an LSP on the original primary link. But the establishment of the LSP on the original primary link is based on an LDP session which should have been established on the original primary link, and at the moment, the LDP session has not been established on the original primary link yet, and the establishment process is relatively long (usually between ten and twenty seconds). During this process, because the LSP on the standby link has been removed and the LSP on the original primary link has not been established yet, no LSP is available to bear the service. As a result, service-bearing transmission may be seriously affected.

SUMMARY OF THE INVENTION

The invention provides a method for recovering service forward routing and a system thereof. Therefore, the problem that no LSP is available to bear services during a recovering process of service forward routing may be avoided so that influence on service-bearing transmission may be reduced.

A method for recovering service forward routing according to the present invention includes the following steps:
suppressing the service forward routing on a standby link from changing during a routing learning process when a primary link recovers from fault state to normal state;
establishing a Label Distribution Protocol (LDP) session on the primary link; and
redirecting the service forward routing on the standby link to the primary link after the LDP session on the primary link is established.

Preferably, the process of suppressing the service forward routing on a standby link from changing includes the following steps:
a router connected directly to the primary link releases a Neighbor Type Length Value (TLV) bearing Link Overload Attribute to a router connected indirectly to the primary link; and
the router connected indirectly to the primary link neglects the Neighbor TLV received during the routing learning process when it detects that The Neighbor TLV received bears Link Overload Attribute.

Preferably, the router connected directly to the primary link releases a Neighbor TLV bearing Link Overload Attribute to the router connected indirectly to the primary link when an Intermediate System-to-Intermediate System (ISIS) Neighbor is established.

Preferably, the Neighbor TLV is Neighbor TLV 2, and the eighth bit of the Default Metric in Neighbor TLV 2 is used to bear the Link Overload Attribute.

Preferably, the Neighbor TLV is Neighbor TLV 22, and a Sub TLV 2 is superimposed in Neighbor TLV 22 to bear the Link Overload Attribute.

Preferably, the Neighbor TLV is Multi-Topology (MT) Intermediate Systems TLV, and a Sub TLV 2 is superimposed in MT Intermediate Systems TLV to bear the Link Overload Attribute.

Preferably, the process of suppressing the service forward routing on a standby link from changing includes the following steps:
the router connected directly to the primary link is shielded from releasing a Neighbor TLV to the router connected indirectly to the primary link; and
the router connected indirectly to the primary link performs routing learning with a default Neighbor TLV.

Preferably, the router connected directly to the primary link is shielded from releasing a Neighbor TLV to the router connected indirectly to the primary link when an ISIS Neighbor is established.

Preferably, the router connected directly to the primary link learns a routing released by an opposite router of the primary link on the basis of the primary link and establishes an LDP session on the primary link.

Preferably, the router connected directly to the primary link is a level-1-2 router. During the process in which the router connected directly to the primary link learns a routing released by an opposite router of the primary link, it is shielded from performing level-2 diffusion and routing penetration.

Preferably, the process of redirecting the service forward routing on the standby link to the primary link includes the following steps:
the router connected directly to the primary link releases a Neighbor TLV bearing no Link Overload Attribute to the router connected indirectly to the primary link when a preset condition is met; and
the router connected indirectly to the primary link proceeds with routing learning according to the received Neighbor TLV bearing no Link Overload Attribute, and redirects the service forward routing on the standby link to the primary link.

Preferably, the process of redirecting the service forward routing on the standby link to the primary link includes the following steps:

the router connected directly to the primary link releases a Neighbor TLV to the router connected indirectly to the primary link when a preset condition is met; and the router connected indirectly to the primary link proceeds with routing learning according to the received Neighbor TLV and redirects the service forward routing on the standby link to the primary link.

Preferably, the preset condition is:

the router connected directly to the primary link detects that an LDP session on the primary link has been established.

Preferably, the preset condition is:

the router connected directly to the primary link starts a timer, of which the timing length has been set, when an ISIS Neighbor is established; and the timer reaches the timing length.

Preferably, the timing length set for the timer is greater than or equal to the time length for establishing an LDP session on the primary link.

A system for recovering service forward routing according to the present invention includes the following elements:

a routing change suppressing unit, configured to suppress the service forward routing on a standby link from changing during a routing learning process when a primary link recovers from fault state to normal state;

an LDP session establishing unit, configured to establish an LDP session on the primary link during the process in which the routing change suppressing unit suppresses the service forward routing on the standby link from changing; and a routing redirecting unit, configured to redirect the service forward routing on the standby link to the primary link after the LDP session establishing unit has established an LDP session on the primary link.

Benefits of the present invention may be summarized as follows:

During the process in which a primary link recovers from fault state to normal state, the LSP on a standby link has been removed while the LDP session on the primary link has not been established, and a new LSP cannot be triggered and established rapidly due to no LDP session is established on the primary link. This causes a problem in that no LSP is available to bear services during this process. In the present invention, such a problem may be avoided, and effects on service-bearing transmission may be reduced. Specifically, the service forward routing on a standby link is suppressed from changing during a routing learning process when a primary link recovers from fault state to normal state, and an LDP session is established on the primary link, and the service forward routing on the standby link is redirected to the primary link after the LDP session has been established on the primary link.

BRIEF DESCRIPTION OF THE DRAWINGS

The invention will become more readily apparent from the Detailed Description of the Invention, which proceeds with reference to the drawings, in which.

DETAILED DESCRIPTION OF THE INVENTION

In the prior art, an MPLS VPN network usually reserves a non-preferred standby link for a primary link, and an LDP session is pre-established on the standby link. Therefore, when a fault occurs on the primary link, the LDP may recover service forward routing to bear services by reestablishing a new LSP on the standby link on the basis of the already established LDP session. This process can be very short (usually several milliseconds). However, after the original primary link recovers from fault state to normal state, the routers on the network may again learn the original service forward routing on the basis of IGP. Because the service forward routing of the original primary link has a higher priority, when the service forward routing on the primary link comes into effect, the LDP removes the LSP established on the standby link and attempts to establish a new LSP on the original primary link. However, at this time, the LDP session on the original primary link has not been established, and the process for establishing an LDP session is relatively long (usually between ten to twenty seconds), so that service-bearing transmission may be affected because no LSP is available to bear services during the establishment period. As a result, a transmission fault may be caused.

In view of the above problem, the present invention provides a method for recovering service forward routing, in which an Intermediate System to Intermediate System (ISIS) protocol interacts with LDP by use of the expansibility of ISIS, so that part of the routing learning may be put off to the time after an LDP session is established on the primary link. Therefore, when each router on the network updates routing on the basis of ISIS Protocol, the establishment of an LDP session may be omitted during the process of establishing a new LSP on the primary link on the basis of LDP, so that services may be transferred to the primary link for bearing transmission.

The principle and embodiments of the method for recovering service forward routing according to the present invention are now described in detail in conjunction with the drawings.

Figure 1:
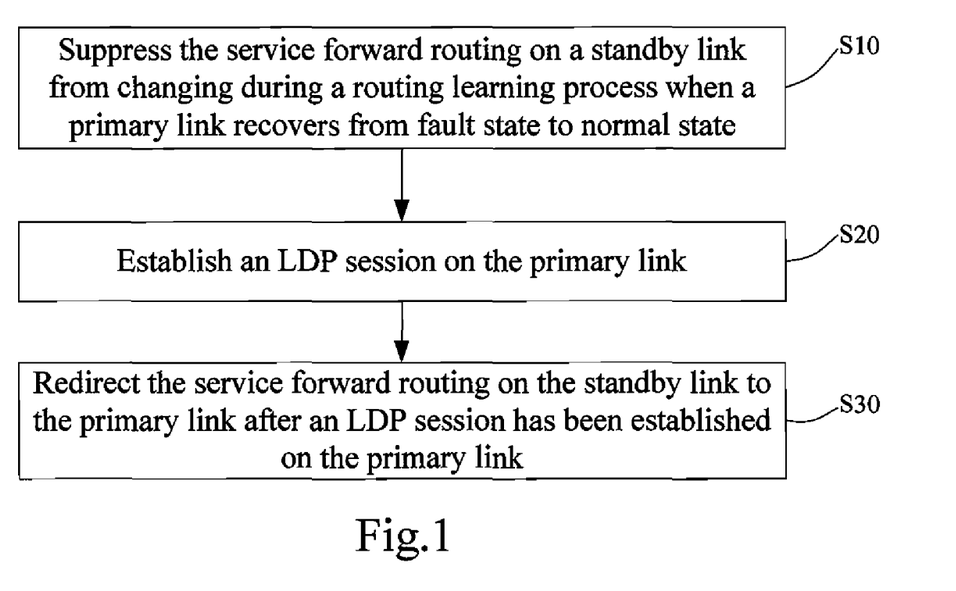
FIG. 1 is a flow chart showing the principle of the method for recovering service forward routing according to the invention.

FIG. 1 provides a flow chart illustrating a method for recovering service forward routing according to the present invention.

In Step S10, the service forward routing on a standby link is suppressed from changing during a routing learning process when a primary link recovers from fault state to normal state; in an MPLS VPN network, the service-bearing priority of the primary link is usually higher than that of a standby link configured for the primary link.

Two suppressing modes may be employed to suppress the service forward routing on a standby link from changing. The first suppressing mode includes the following steps:

A1: First of all, a router connected directly to the primary link releases a Neighbor TLV bearing Link Overload Attribute to a router connected indirectly to the primary link; the router connected directly to the primary link then may release the Neighbor TLV bearing Link Overload Attribute to the router connected indirectly to the primary link when an ISIS (Intermediate System-to-Intermediate System) neighbor is established;

if the Neighbor TLV is Neighbor TLV 2, the eighth bit of Default Metric in Neighbor TLV 2 may be used to bear Link Overload Attribute;

if the Neighbor TLV is Neighbor TLV 22 (i.e. an IS reachability TLV), a Sub TLV 2 is superimposed in Neighbor TLV 22 to bear a Link Overload Attribute;

if the Neighbor TLV is a MT Intermediate Systems TLV (Multi-topology Intermediate Systems Type Length Value), a Sub TLV 2 may be superimposed in the MT Intermediate Systems TLV to bear the Link Overload Attribute, because the first two bytes of a MT Intermediate Systems TLV are a reserved field MT ID, and the subsequent format is totally the same as that of the Neighbor TLV 22 (IS reachability TLV); and A2: The router connected indirectly to the primary link neglects the received Neighbor TLV during routing learning process when it detects that the received Neighbor TLV bears the Link Overload Attribute, so that the service forward routing on a standby link is suppressed from changing and service forward routing is not recovered to the primary link (because the LDP session on the primary link has not been established at the moment).

The steps of the second suppressing mode are as follows:

B1: The router connected directly to the primary link is shielded from releasing a Neighbor TLV to the router connected indirectly to the primary link (that is, the router connected directly to the primary link does not release a Neighbor TLV to the whole network during the routing learning process when a primary link recovers from fault state to normal state); the router connected directly to the primary link is shielded from releasing a Neighbor TLV to the router connected indirectly to the primary link during the establishment of ISIS Neighbor; and B2: The router connected indirectly to the primary link performs routing learning with a default Neighbor TLV, so that the service forward routing on a standby link is suppressed from changing and service forward routing is not recovered to the primary link (because the LDP session on the primary link has not been established at the moment).

The second suppressing mode is applicable when a router which does not support the Link Overload Attribute exists on the whole network. Because the first suppressing mode requires that all routers on the whole network should support the Link Overload Attribute, if a router which does not support the Link Overload Attribute exists on the network and the first suppressing mode is used directly, then a routing loop may appear. In such a case, the second suppressing mode should be used in place of the first suppressing mode.

In Step S20, an LDP session is established on the primary link at the same time when the above Step S10 is performed; the router connected directly to the primary link may learn the routing release by an opposite router of the primary link on the basis of the primary link, so that corresponding LDP session may be established on the primary link.

Notably, if the first suppressing mode is employed in Step S10 to suppress the service forward routing on a standby link from changing and the router connected directly to the primary link is a level-1-2 router, then during the process in which the router connected directly to the primary link learns a routing released by an opposite router of the primary link level-2 diffusion and routing penetration should be shielded.

In Step S30, after an LDP session has been established on the primary link, the service forward routing on the standby link is redirected to the primary link, so that services on the standby link are switched to the primary link. When the primary link recovers to normal state, the LDP session has been established on it, so when service forward routing is redirected to the primary link, a new LSP may be triggered and established on the basis of the already established LDP session for bearing transmission service. Therefore, the bearer service may be recovered accurately and effects on service-bearing transmission may be reduced.

If the first suppressing mode is employed in Step S10 to suppress the service forward routing on a standby link from changing, then the process of redirecting the service forward routing on the standby link to the primary link in Step S30 includes the following steps:

C1: The router connected directly to the primary link releases a Neighbor TLV bearing no Link Overload Attribute to the router connected indirectly to the primary link when a preset condition is met;

[The preset condition is satisfied by one of the following two circumstances:

1) The router connected directly to the primary link detects that an LDP session on the primary link has been established.

2) The router connected directly to the primary link starts a timer, of which the timing length has been set during the establishment of ISIS Neighbor, and the timer reaches the set timing length (the timing length set for the timer is usually greater than or equal to the time length for establishing an LDP session on the primary link).]

C2: At this moment, the router connected indirectly to the primary link proceeds with routing learning according to the received Neighbor TLV bearing no Link Overload Attribute, so that service forward routing is redirected to the primary link.

Additionally, if the second suppressing mode is employed in Step S10 to suppress the service forward routing on a standby link from changing, then the process of redirecting the service forward routing on the standby link to the primary link in Step S30 is as follows:

D1: The router connected directly to the primary link releases a normal Neighbor TLV to the router connected indirectly to the primary link when a preset condition is met;

[The preset condition is satisfied by one of the following two circumstances:

11) The router connected directly to the primary link detects that an LDP session on the primary link has been established.

12) The router connected directly to the primary link starts a timer, of which the timing length has been set during the establishment of ISIS Neighbor, and the timer reaches the set timing length (the timing length set for the timer is usually greater than or equal to the time length for establishing an LDP session on the primary link).]

D2: At this moment, the router connected indirectly to the primary link proceeds with routing learning according to the received normal Neighbor TLV, so that service forward routing is redirected to the primary link.

One embodiment of the principle of the method according to the invention is now described.

Figure 2:
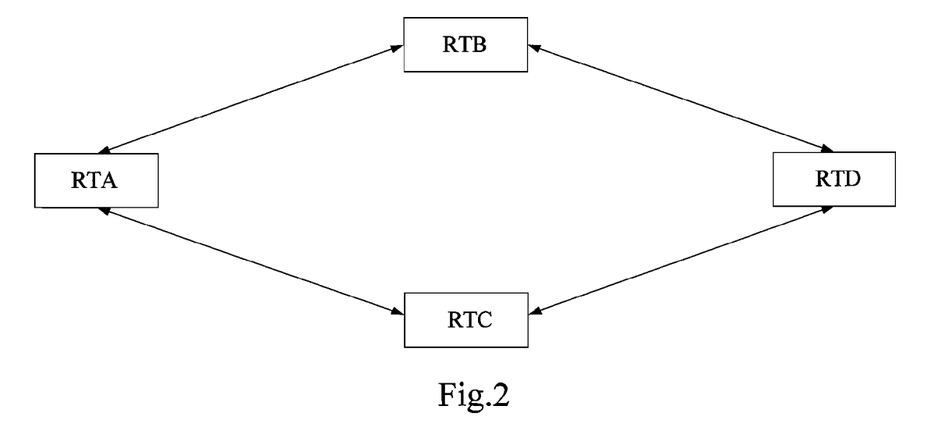
FIG. 2 is a schematic diagram of an MPLS backbone path composed of four routers in an MPLS VPN network.

FIG. 2 shows a schematic diagram of an MPLS backbone path composed of four routers on an MPLS VPN network. In FIG. 2, four routers (RTA, RTB, RTC and RTD) constitute an MPLS backbone path, and ISIS routing protocol is run respectively on routers RTA, RTB, RTC and RTD so as to release and learn a routing. RTA=>RTB=>RTD is the preferred path; RTA=>RTC=>RTD is the backup path. At the same time, LDP is run respectively on the four routers so as to establish an LSP on RTA=>RTB=>RTD and RTA=>RTC=>RTD. Here, it is assumed that an LSP on RTA=>RTB=>RTD has been established.

According to the prior art, when a fault occurs on the link between routers RTB and RTD, the LSP on the original link RTA=>RTB=>RTD is removed at once and an LSP on the standby link RTA=>RTC=>RTD is reestablished. This process is very short (usually several milliseconds), because corresponding LDP session has been established on the standby link RTA=>RTC=>RTD.

However, in such a case, after the link between routers RTB and RTD recovers to normal state, a new service forward routing is computed rapidly by each router according to ISIS Protocol. Because service forward routing on RTA=>RTB=>RTD is more preferable than that on RTA=>RTC=>RTD, the preferred path is converted back to RTA=>RTB=>RTD, and LDP removes the LSP on the standby link RTA=>RTC=>RTD immediately. However, because the LDP session between the RTB and RTD has not been established yet and the establishment process is relatively long, the LSP on the link RTA=>RTB=>RTD cannot be established immediately, so that the service-bearing transmission may be affected.

To solve the above problem, a method according to the invention includes the following steps:

1. First of all, extend the Neighbor TLV of ISIS Protocol to enable it to carry so-called Link Overload Attribute.
For a Neighbor TLV 2, the eighth bit (reserved bit) of Default Metric may be used;
For a Neighbor TLV 22 (i.e. IS reachability TLV), a new Sub TLV 2 may be defined to carry Link Overload Attribute;
For a MT Intermediate Systems TLV, the first two bytes are reserved field MT ID and the subsequent format is totally the same as that of Neighbor TLV 22 (i.e. IS reachability TLV), so that the same new Sub TLV 2 may be used to carry Link Overload Attribute;

2. From the time when an ISIS Neighbor is established, the routers connected directly to the original link (RTB and RTD) carry Link Overload Attribute in the released Neighbor TLV;

3. When routing learning is performed on the routers (RTA and RTC in FIG. 2) connected indirectly to the original link (the link between RTB and RTD), the received Neighbor TLV is checked to see whether Link Overload Attribute is carried therein; if Link Overload Attribute is set, then the received Neighbor TLV is neglected and is not used for routing learning. As a result, when no LDP is established on the original link (the link between RTB and RTD), the service forward routing on the standby link (RTA=>RTC=>RTD) is suppressed from being redirected to the original link (the link between RTB and RTD), and therefore the service forward routing, on which the LSP depends, established on the standby link (RTA=>RTC=>RTD) is not changed, and the LSP established on the standby link RTA=>RTC=>RTD is not removed immediately.

4. When the routers (RTB and RTD in FIG. 2) connected directly to the original link (the link between RTB and RTD) perform routing learning (here, it is assumed that routing learning is performed on RTB), the original link (but without limitation) is used only when the routing released by an opposite router of the original link (i.e. the routing released by RTD) is to be processed. Therefore, it can be ensured that the next hop of the routing learnt by router RTB and released by the opposite router (i.e. the routing released by RTD) is the link recovered just now, so that the objective of guiding the establishment of an LDP session on the original link (the link between RTB and RTD) may be achieved.

When the routers connected directly to the original link (i.e. RTB and RTD) are level-1-2 routers, if the routing released by an opposite router is learnt with a Neighbor TLV carrying the Link Overload Attribute, then Level-2 diffusion and routing penetration should not be performed.

5. When the routers (i.e. RTB and RTD in FIG. 2) connected directly to the original link (the link between RTB and RTD) detect that an LDP has been established on the link between RTB and RTD, the Link Overload Attribute carried in the Neighbor TLV released to the routers connected indirectly to the original link (i.e. RTA and RTC in FIG. 2) is cleared.

Alternatively, at the time when an ISIS Neighbor is established, a timer is started, of which the timing length is configurable. Therefore, when the timer times out, the Link Overload Attribute carried in the Neighbor TLV released to the routers connected indirectly to the original link (i.e. RTA and RTC in FIG. 2) is cleared. The timing length set for the timer started is greater than or equal to the time length for establishing an LDP session on the original link (the link between RTB and RTD).

6. After the routers (i.e. RTA and RTC in FIG. 2) connected indirectly to the original link (the link between RTB and RTD) receive a Neighbor TLV without a Link Overload Attribute, a normal routing computation is started on the basis of the Neighbor TLV without the Link Overload Attribute. Therefore, it may be guided to redirect the service forward routing on RTA=>RTC=>RTD to RTA=>RTB=>RTD. At this moment, an LDP session has been established on the link between RTB and RTD, so a new LSP may be triggered and established on the basis of the already established LDP session rapidly (usually several milliseconds). As a result, effects on service-bearing transmission are minimized and transmission fault is avoided.

In the above process, each router on the MPLS VPN network should support the Link Overload Attribute respectively. For routers which do not support the Link Overload Attribute, if a Neighbor TLV carrying the Link Overload Attribute is used again, then a routing loop may appear. Therefore, when routers which do not support the Link Overload Attribute exist on an MPLS VPN network, the following alternative solution of the invention may be employed:

a) From the time when an ISIS Neighbor is established, the routers connected directly to the original links (RTB and RTD) do not release a Neighbor TLV any more, while RTB and RTD are required to release Neighbor TLV normally.

b) The routers (i.e. RTA and RTC in FIG. 2) connected indirectly to the original link (the link between RTB and RTD) perform routing learning with a default Neighbor TLV; because no Neighbor TLV is released by RTB and RTD, for routers RTA and RTC connected indirectly to the original link, it is the same as the above solution where the Neighbor TLV is neglected. Therefore, it can also be ensured that the service forward routing on the standby link (RTA=>RTC=>RTD) is suppressed from being redirected to the original link (the link between RTB and RTD) when no LDP is established on the original link (the link between RTB and RTD). As a result, the service forward routing, on which the LSP depends, established on the standby link (RTA=>RTC=>RTD) is not changed, and the LSP established on the standby link RTA=>RTC=>RTD is not removed immediately.

c) The subsequent process is the same as that in step 4 and it is not described again here.

d) When the routers (i.e. RTB and RTD in FIG. 2) connected directly to the original link (the link between RTB and RTD) detect that an LDP has been established on the link between RTB and RTD, it is recovered to release the Neighbor TLV to the routers connected indirectly to the original link (i.e. RTA and RTC in FIG. 2).

Alternatively, at the time when an ISIS Neighbor is established, a timer is started, of which the timing length may be configured. Therefore, when the timer times out, it is recovered to release the Neighbor TLV to the routers connected indirectly to the original link (i.e. RTA and RTC in FIG. 2). The timing length set for the timer started is greater than or equal to the time length for establishing an LDP session on the original link (the link between RTB and RTD).

e) After the routers (i.e. RTA and RTC in FIG. 2) connected indirectly to the original link (the link between RTB and RTD) receive a normal Neighbor TLV, a normal routing computation is started on the basis of the received Neighbor TLV. Therefore, it may be guided to redirect the service forward routing on RTA=>RTC=>RTD to RTA=>RTB=>RTD. At this moment, an LDP session has been established on the link between RTB and RTD, so a new LSP may be triggered and rapidly established on the basis of the already established LDP session (usually within several milliseconds). As a result, influence on service-bearing transmission is minimized and transmission fault is avoided.

Figure 3:
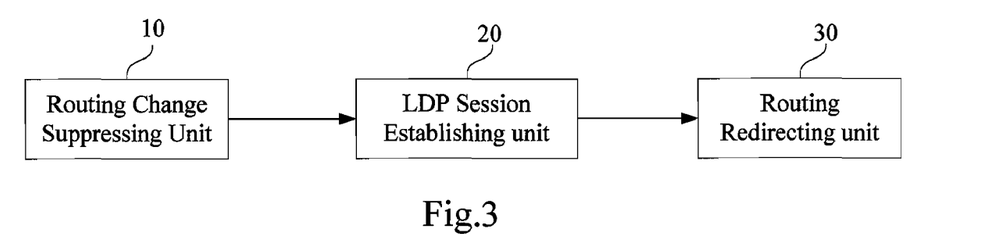
FIG. 3 is a structure diagram of a system for recovering service forward routing according to the invention.

Corresponding to the method of the invention, a system for recovering service forward routing is further provided, as shown in FIG. 3, which shows a structure diagram of a system for recovering service forward routing according to the invention. The system includes: a routing change suppressing unit 10, an LDP session establishing unit 20 and a routing redirecting unit 30.

The routing change suppressing unit 10 is configured to suppress the service forward routing on a standby link from changing during a routing learning process when a primary link recovers from fault state to normal state;

the LDP session establishing unit 20 is configured to establish an LDP session on the primary link during the process in which the routing change suppressing unit 10 suppresses the service forward routing on a standby link from changing; and the routing redirecting unit 30 is configured to redirect the service forward routing on the standby link to the primary link after the LDP session establishing unit 20 has established an LDP session on the primary link.

For details of other related techniques in the system according to the invention, reference may be made to related descriptions of the method according to the invention.

Additional advantages and modifications will readily occur to those skilled in the art. Therefore, the invention in its broader aspects is not limited to the specific details and representative embodiments shown and described herein. Accordingly, various variations and modifications may be made without departing from the spirit or scope of the invention as defined by the appended claims. It is also within the scope of the present invention to include all foreseeable equivalents to the elements and structures as defined with reference to FIGS. 1-3.

The invention claimed is:

1. A method for recovering service forward routing, comprising:
    suppressing service forward routing on a standby link from changing during a routing learning process when a primary link recovers from a fault state to a normal state;
    establishing a Label Distribution Protocol (LDP) session on the primary link, wherein when the primary link recovers to the normal state, the LDP session is established on the primary link; and
    redirecting the service forward routing on the standby link to the primary link after the LDP session on the primary link is established,
    wherein suppressing the service forward routing on a standby link from changing further comprises:
    releasing, by a first router connected directly to the primary link, a Neighbor Type Length Value (TLV) bearing a Link Overload Attribute to a second router connected indirectly to the primary link when an Intermediate System-to-Intermediate System (ISIS) Neighbor is established; and
    neglecting, by the second router connected indirectly to the primary link, the Neighbor TLV during the routing learning process when the second router detects that the received Neighbor TLV bears the Link Overload Attribute,
    and wherein redirecting the service forward routing on the standby link to the primary link comprises:
    releasing, by the first router connected directly to the primary link, a Neighbor TLV bearing no Link Overload Attribute to a second router connected indirectly to the primary link when a preset condition is met;
    performing, by the second router connected indirectly to the primary link, routing learning according to the Neighbor TLV bearing no Link Overload Attribute; and
    redirecting, by the second router connected indirectly to the primary link, the service forward routing on the standby link to the primary link.

2. The method according to claim 1 wherein the Neighbor TLV is a Neighbor TLV 2, comprising the step of:
    bearing the Link Overload Attribute by an eighth bit of a Default Metric in the Neighbor TLV 2.

3. The method according to claim 1, wherein the Neighbor TLV is a Neighbor TLV 22, comprising the step of:
    bearing the Link Overload Attribute by a Sub Type Length Value (Sub TLV) 2 added in the Neighbor TLV 22.

4. The method according to claim 1, wherein, the Neighbor TLV is a Multi-Topology (MT) Intermediate Systems TLV, comprising the step of:
    bearing the Link Overload Attribute by a Sub TLV 2 added in MT Intermediate Systems TLV.

5. The method according to claim 1, comprising the steps of:
    learning, by a first router connected directly to the primary link, a routing released by an opposite router of the primary link on the basis of the primary link, and
    establishing an LDP session on the primary link.

6. The method according to claim 5, wherein the first router connected directly to the primary link is a level-1-2 router, the method comprising the step of:
    shielding the first router connected directly to the primary link from performing level-2-flooding and routing leaking during the process of learning a routing released by an opposite router of the primary link.

7. The method according to claim 1, wherein the preset condition comprises:
    detecting, by the first router connected directly to the primary link, that an LDP session on the primary link has been established.

8. The method according to claim 1, wherein the preset condition comprises:
    reaching, by a timer, the end of a preset length, wherein the timer is started by the first router connected directly to the primary link at the establishment of an ISIS Neighbor.

9. The method according to claim 8, wherein the present length set for the timer is greater than or equal to the time length for establishing an LDP session on the primary link.

10. A system for recovering service forward routing, comprising:
- a routing change suppressing unit, configured to suppress the service forward routing on a standby link from changing during a routing learning process when a primary link recovers from a fault state to a normal state;
- a Label Distribution Protocol (LDP) session establishing unit, configured to establish an LDP session on the primary link during the process in which the routing change suppressing unit suppresses the service forward routing on a standby link from changing; and
- a routing redirecting unit, configured to redirect the service forward routing on the standby link to the primary link after the LDP session establishing unit has established an LDP session on the primary link,
- wherein the routing change suppressing unit is configured to suppress the service forward routing on a standby link from changing by:
- releasing, by a first router connected directly to the primary link, a Neighbor Type Length Value (TLV) bearing a Link Overload Attribute to a second router connected indirectly to the primary link when an Intermediate System-to-Intermediate System (ISIS) Neighbor is established;
- receiving, by the second router connected indirectly to the primary link, the Neighbor TLV released by the first router; and
- neglecting, by the second router connected indirectly to the primary link, the Neighbor TLV during a routing learning process when the second router detects that the received Neighbor TLV bears the Link Overload Attribute,
- and wherein routing redirecting unit is configured to redirect the service forward routing on the standby link to the primary link by:
- releasing, by the first router connected directly to the primary link, a Neighbor TLV bearing no Link Overload Attribute to the second router connected indirectly to the primary link when a preset condition is met;
- proceeding, by the second router connected indirectly to the primary link, routing learning according to the Neighbor TLV bearing no Link Overload Attribute; and
- redirecting, by the second router connected indirectly to the primary link, the service forward routing on the standby link to the primary link.

* * * * *